United States Patent
Sun et al.

(10) Patent No.: US 10,162,151 B2
(45) Date of Patent: Dec. 25, 2018

(54) F-THETA PHOTOLITHOGRAPHIC LENSES

(71) Applicant: HAN'S LASER TECHNOLOGY INDUSTRY GROUP CO., LTD., Shenzhen, Guangdong (CN)

(72) Inventors: Bo Sun, Shenzhen (CN); Jiaying Li, Shenzhen (CN); Chaoming Zhou, Shenzhen (CN); Yunfeng Gao, Shenzhen (CN)

(73) Assignee: HAN'S LASER TECHNOLOGY INDUSTRY GROUP CO., LTD., Shenzhen (CN)

( * ) Notice: Subject to any disclaimer, the term of this patent is extended or adjusted under 35 U.S.C. 154(b) by 93 days.

(21) Appl. No.: 15/518,076

(22) PCT Filed: Nov. 28, 2014

(86) PCT No.: PCT/CN2014/092428
§ 371 (c)(1),
(2) Date: Apr. 10, 2017

(87) PCT Pub. No.: WO2016/082171
PCT Pub. Date: Jun. 2, 2016

(65) Prior Publication Data
US 2018/0267272 A1    Sep. 20, 2018

(51) Int. Cl.
*G02B 13/00* (2006.01)
*B23K 26/06* (2014.01)
*B23K 26/359* (2014.01)

(52) U.S. Cl.
CPC ...... *G02B 13/0005* (2013.01); *B23K 26/0648* (2013.01); *G02B 13/0035* (2013.01); *B23K 26/359* (2015.10)

(58) Field of Classification Search
CPC .............. G02B 13/0005; B23K 26/0648
(Continued)

(56) References Cited

U.S. PATENT DOCUMENTS 4,277,128 A * 7/1981 Kawamura ........ G02B 13/0005
359/207.1
5,835,280 A * 11/1998 Griffith ................. B41J 2/471
359/662

(Continued)

FOREIGN PATENT DOCUMENTS

CN        2585256 Y    11/2003
CN      101369047 A     2/2009
(Continued)

OTHER PUBLICATIONS

International Search Report dated Jun. 29, 2015 issued in International Application No. PCT/CN2014/092428 with English translation.

Primary Examiner — James Greece
(74) Attorney, Agent, or Firm — Polsinelli PC

(57) ABSTRACT

An F-θ lens for laser engraving includes a first lens (L1), a second lens (L2), a third lens (L3), and a fourth lens (L4), which are coaxially arranged along a transmission direction of incident light; wherein the first lens (L1) is a meniscus lens, the second lens (L2) is a meniscus lens, the third lens (L3) is a plano-convex lens, and the fourth lens (L4) is a flat lens; wherein the first lens (L1) has a first surface (S1) and a second surface (S2), the second lens (L2) has a third surface (S3) and a fourth surface (S4), the third lens (L3) has a fifth surface (S5) and a sixth surface (S6), and the fourth lens (L4) has a seventh surface (S7) and an eighth surface (S8); the first surface (S1) to the eighth surface (S8) are sequentially arranged along the transmission direction of the incident light; wherein radii of curvature of the first surface (S1) to the eighth surface (S8) are −29 mm, −88 mm, −56 mm, −36 mm, ∞, −116 mm, ∞, and ∞, respectively; and (Continued)

center thicknesses (d1, d2, d3, d4) of the first lens (L1) to the fourth lens (L4) are 3 mm, 6 mm, 6 mm, and 3 mm, respectively.

6 Claims, 6 Drawing Sheets

(58) Field of Classification Search
USPC .......................................................... 359/662
See application file for complete search history.

(56) References Cited

U.S. PATENT DOCUMENTS

2015/0293333 A1* 10/2015 Li ...................... G02B 13/0005
359/356
2017/0312851 A1* 11/2017 Sun .................... B23K 26/0648

FOREIGN PATENT DOCUMENTS

| CN | 101881875 A | 11/2010 |
| CN | 203025408 U | 6/2013 |
| CN | 203275743 U | 11/2013 |

* cited by examiner

F-THETA PHOTOLITHOGRAPHIC LENSES

CROSS REFERENCE TO RELATED APPLICATIONS

This application is a National Phase filing under 35 U.S.C. § 371 of PCT/CN2014/092428 filed on Nov. 28, 2014. The entire contents of the application is hereby incorporated by reference.

FIELD OF THE INVENTION

The present disclosure relates generally to the field of optics, and more specifically to an F-θ lens for laser engraving.

BACKGROUND OF THE INVENTION

With the development of electronic products such as mobile phones, personal computers and flat-panel TVs, the demand for production of panels on these products has also increased. In the production process of the panel, it is needed to mark the panel with laser, scribe and cut the panel, and in order to ensure that the panel meets the technical requirements of the product, when marking the panel with laser, it is to be ensured that the engraved lines are "fine" and "deep". Therefore, requirements for the F-θ lens for laser engraving of a laser engraver are getting higher and higher.

Conventional laser engravers have a single F-θ lens or a plurality of F-θ lenses (typically up to three) for laser engraving. The use of a single F-θ lens for laser engraving can improve the quality of the engraved line, but the engraving speed is very low—only one line at a time. As for the use of three F-θ lens for laser engraving, although the engraving speed is higher, limited by materials and technics, it is difficult to provide engraved lines with high-quality.

SUMMARY

Therefore, it is necessary to provide an F-θ lens for laser engraving which can provide engraved lines with high-quality at a high engraving speed.

An F-θ lens for laser engraving includes a first lens, a second lens, a third lens, and a fourth lens, which are coaxially arranged along a transmission direction of incident light; wherein the first lens is a meniscus lens, the second lens is a meniscus lens, the third lens is a plano-convex lens, and the fourth lens is a flat lens; wherein the first lens has a first surface and a second surface, the second lens has a third surface and a fourth surface, the third lens has a fifth surface and a sixth surface, and the fourth lens has a seventh surface and an eighth surface; the first surface to the eighth surface are sequentially arranged along the transmission direction of the incident light; wherein radii of curvature of the first surface to the eighth surface are −29 mm, −88 mm, −56 mm, −36 mm, ∞, −116 mm, ∞, and ∞, respectively; and center thicknesses of the first lens to the fourth lens are 3 mm, 6 mm, 6 mm, and 3 mm, respectively.

In one embodiment, a ratio of refractive index to Abbe number of the first lens is 1.50/62, a ratio of refractive index to Abbe number of the second lens is 1.80/25, a ratio of refractive index to Abbe number of the third lens is 1.80/25, and a ratio of refractive index to Abbe number of the fourth lens is 1.50/62.

In one embodiment, an interval between the second surface and the third surface is 2 mm, an interval between the fourth surface and the fifth surface is 0.2 mm, and an interval between the sixth surface and the seventh surface is 2 mm.

In one embodiment, each of the radii of curvature, the center thicknesses, and the intervals has a tolerance range of 5%.

The foregoing F-θ lens for laser engraving employs lens of F-θ structure, therefore it can provide engraved lines with high-quality such that the engraved lines are "fine" and "deep", and it has a high engraving speed which makes it more efficient than conventional F-θ lenses for laser engraving.

BRIEF DESCRIPTION OF THE DRAWINGS

The above and other objects, features and advantages of the present disclosure will become more apparent referring to the detailed description of the preferred embodiments as illustrated in the accompanying drawings. The components in the drawings are not necessarily drawn to scale, the emphasis instead being placed upon clearly illustrating the principles of the present disclosure.

DETAILED DESCRIPTION OF THE EMBODIMENTS

Embodiments of the disclosure are described more fully hereinafter with reference to the accompanying drawings. Numerous specific details are described hereinafter in order to facilitate a thorough understanding of the present disclosure. The various embodiments of the disclosure may, however, be embodied in many different forms and should not be construed as limited to the specific embodiments set forth hereinafter, and people skilled in the art can make similar modifications without departing from the spirit of the present disclosure.

Figure 1:
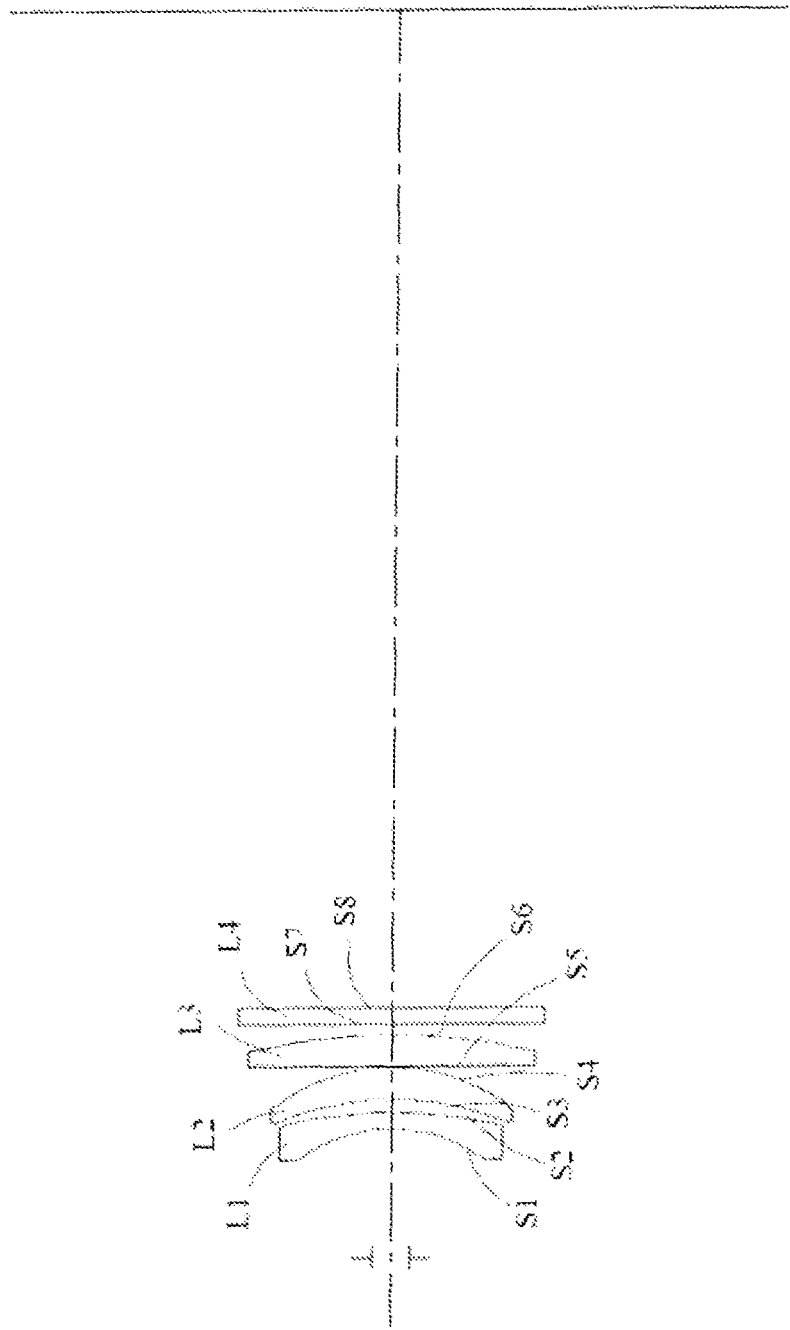
FIG. 1 is a schematic diagram of an F-θ lens for laser engraving according to an embodiment.

FIG. 1 is a schematic diagram of an F-θ lens for laser engraving according to an embodiment, for illustrative purposes, only portions related to implementation of the disclosure are shown.

As shown in FIG. 1, the F-θ lens for laser engraving includes a first lens L1, a second lens L2, a third lens L3, and a fourth lens L4, which are coaxially arranged along a transmission direction of incident light.

In the F-θ lens for laser engraving, the negative sign indicates that the light transmits from left side to right side. Whether the radius of curvature is positive or negative is determined by the position of the intersection of a center of the spherical surface of the curved surface and a main optical axis. When the center of the spherical surface of the curved surface is on the left side of the intersection, the radius of curvature is negative; when the center of the spherical surface of the curved surface is on the right side of the intersection, the radius of curvature is positive. It follows the same rule below.

Figure 2:
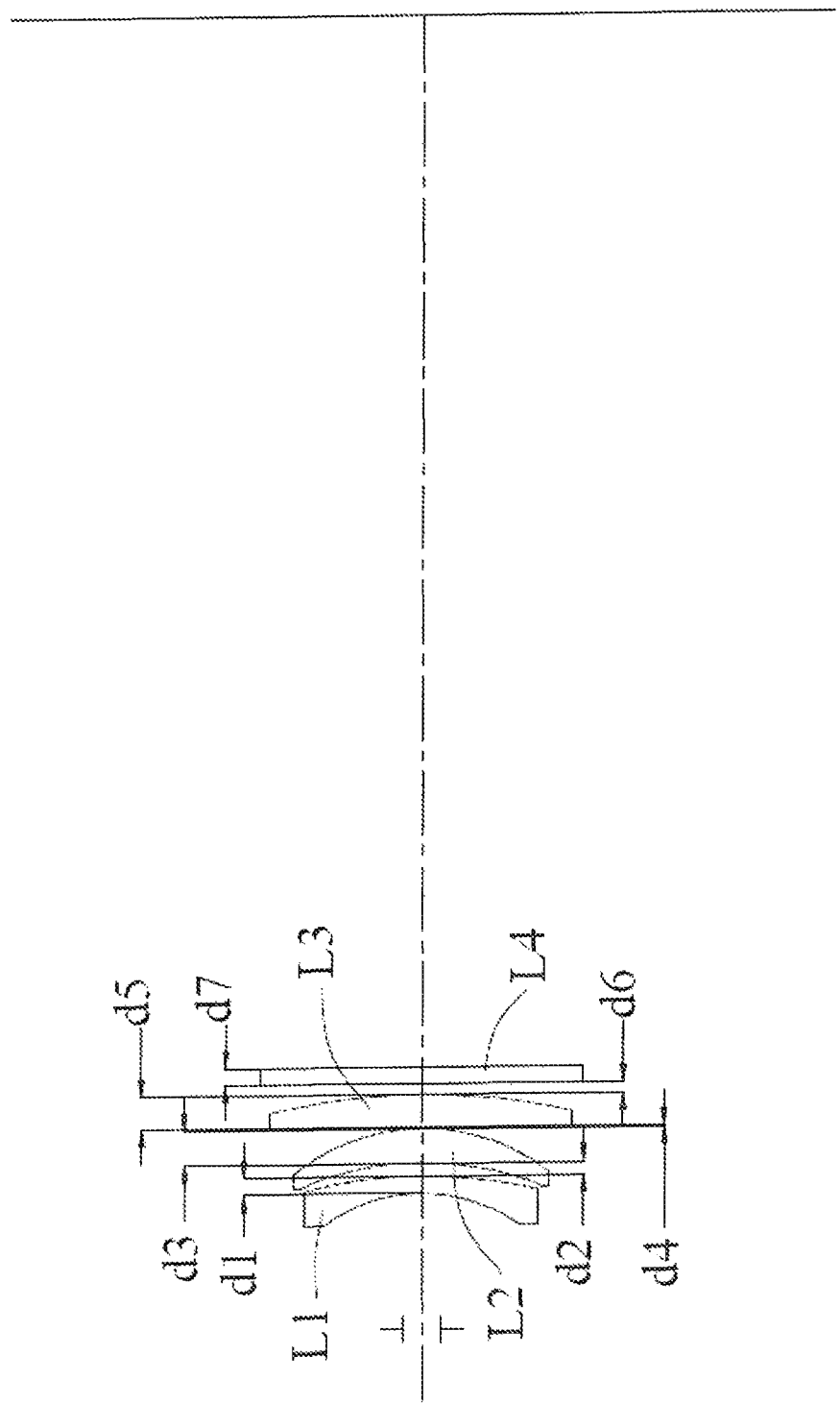
FIG. 2 is a diagram illustrating intervals between components of the F-θ lens for laser engraving of FIG. 1.

As shown in FIG. 1 and FIG. 2, the first lens L1 is a meniscus lens having a first surface S1 and a second surface S2. The first surface S1 is convex towards the image side, a radius of curvature of which is −29 mm; the second surface S2 is also convex towards the image side, and a radius of curvature of which is −88 mm. A center thickness d1 of the first lens L1 (i.e., a thickness of the first lens L1 along an optical axis) is 3 mm. A ratio of the refractive index to the Abbe number of the first lens L1 is 1.50/62. The foregoing parameters of the first lens L1 are not the only choice, as there is a 5% tolerance range, i.e. those parameters can vary within a range of ±5%.

The second lens L2 is a meniscus lens having a third surface S3 and a fourth surface S4. The third surface S3 is convex towards the image side, a radius of curvature of which is −56 mm; the fourth surface S4 is also convex towards the image side, and a radius of curvature of which is −36 mm. A center thickness d3 of the second lens L2 is 6 mm. A ratio of the refractive index to the Abbe number of the second lens L2 is 1.80/25. Each parameter of the second lens L2 has a tolerance range of 5%.

The third lens L3 is a plano-convex lens having a fifth surface S5 and a sixth surface S6. The fifth surface S5 is a plane of which a radius of curvature is ∞, i.e., infinity; the sixth surface S6 is also convex towards the image side, and a radius of curvature of which is −116 mm. A center thickness d5 of the third lens L3 is 6 mm. A ratio of the refractive index to the Abbe number of the third lens L3 is 1.80/25. Each parameter of the third lens L3 has a tolerance range of 5%.

The fourth lens L4 is for protecting the lenses and is a flat lens having a seventh surface S7 and an eighth surface S8. Both the seventh surface S7 and the eighth surface S8 are planes, and radii of curvature of which are ∞. A center thickness d7 of the fourth lens L4 is 3 mm. A ratio of the refractive index to the Abbe number of the fourth lens L4 is 1.50/62. Each parameter of the fourth lens L4 has a tolerance range of 5%.

The first surface S1 to the eighth surface S8 are sequentially arranged along the transmission direction of the incident light.

In one embodiment, an interval d2 between a light outgoing surface (the second surface S2) of the first lens L1 and a light incidence surface (the third surface S3) of the second lens L2 along the optical axis is 2 mm, with a tolerance of 5%. An interval d4 between the outgoing surface (the fourth surface S4) of the second lens L2 and the incident surface (the fifth surface S5) of the third lens L3 along the optical axis is 0.2 mm, with a tolerance of 5%. An interval d6 between the outgoing surface (the sixth surface S6) of the third lens L3 and the incident surface (the seventh surface S7) of the protective lens L4 along the optical axis is 2 mm, with a tolerance of 5%.

The foregoing F-θ lens for laser engraving has a focal length f=160 mm, an outer diameter Φ of 7 mm, a work area A of 100*100 mm, and an operating wavelength λ of 1064 nm. When the F-θ lens for laser engraving is used for engraving, a depth of the engraved line can reach 0.5 mm; if the F-θ lens for laser engraving has a numerical aperture angle sinα=0.02, a width of the line can reach 0.03 mm.

Figure 3A:
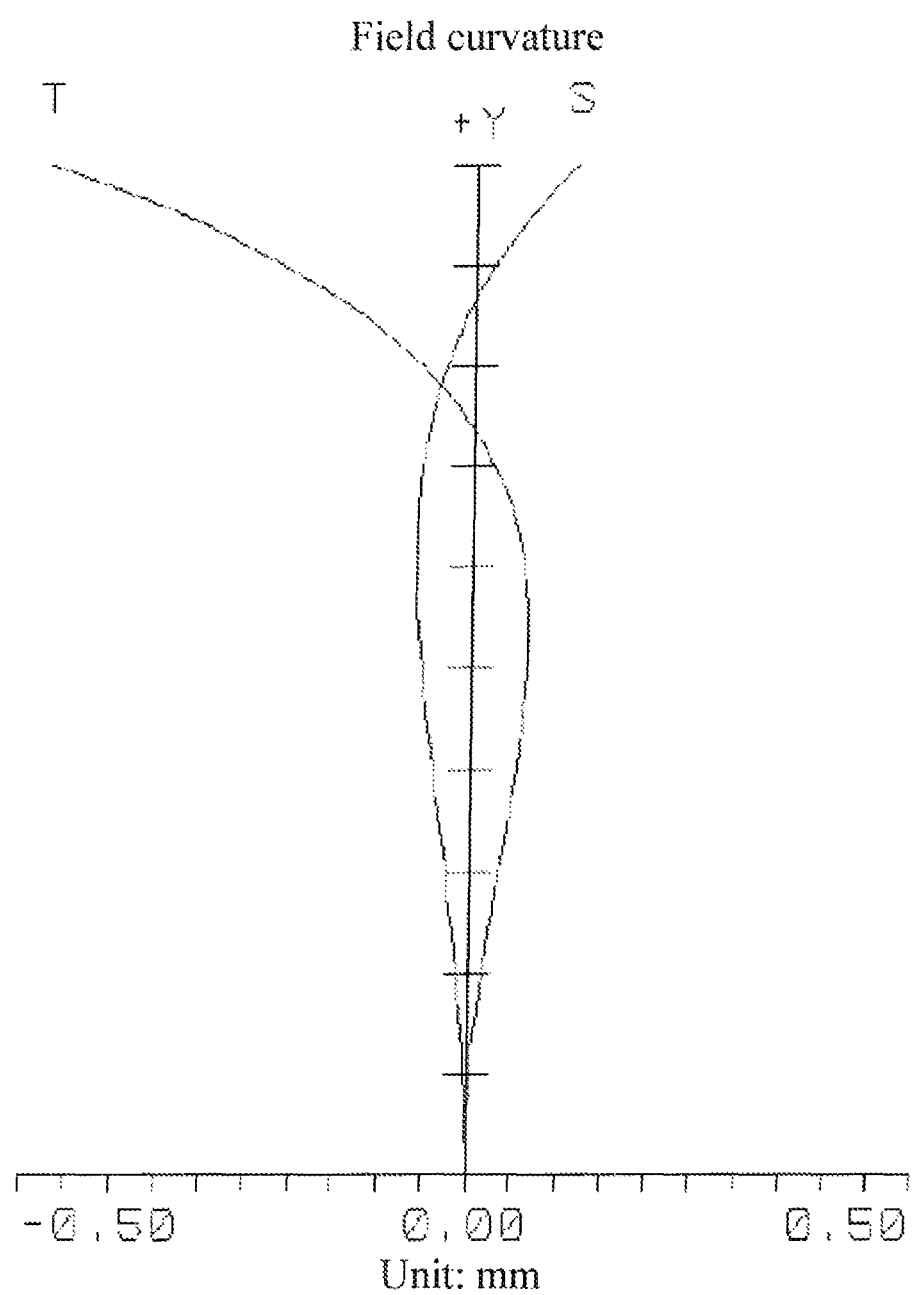
FIG. 3 is a diagram illustrating a fine beam aberration of an F-θ lens for laser engraving according to an embodiment.
Figure 3B:
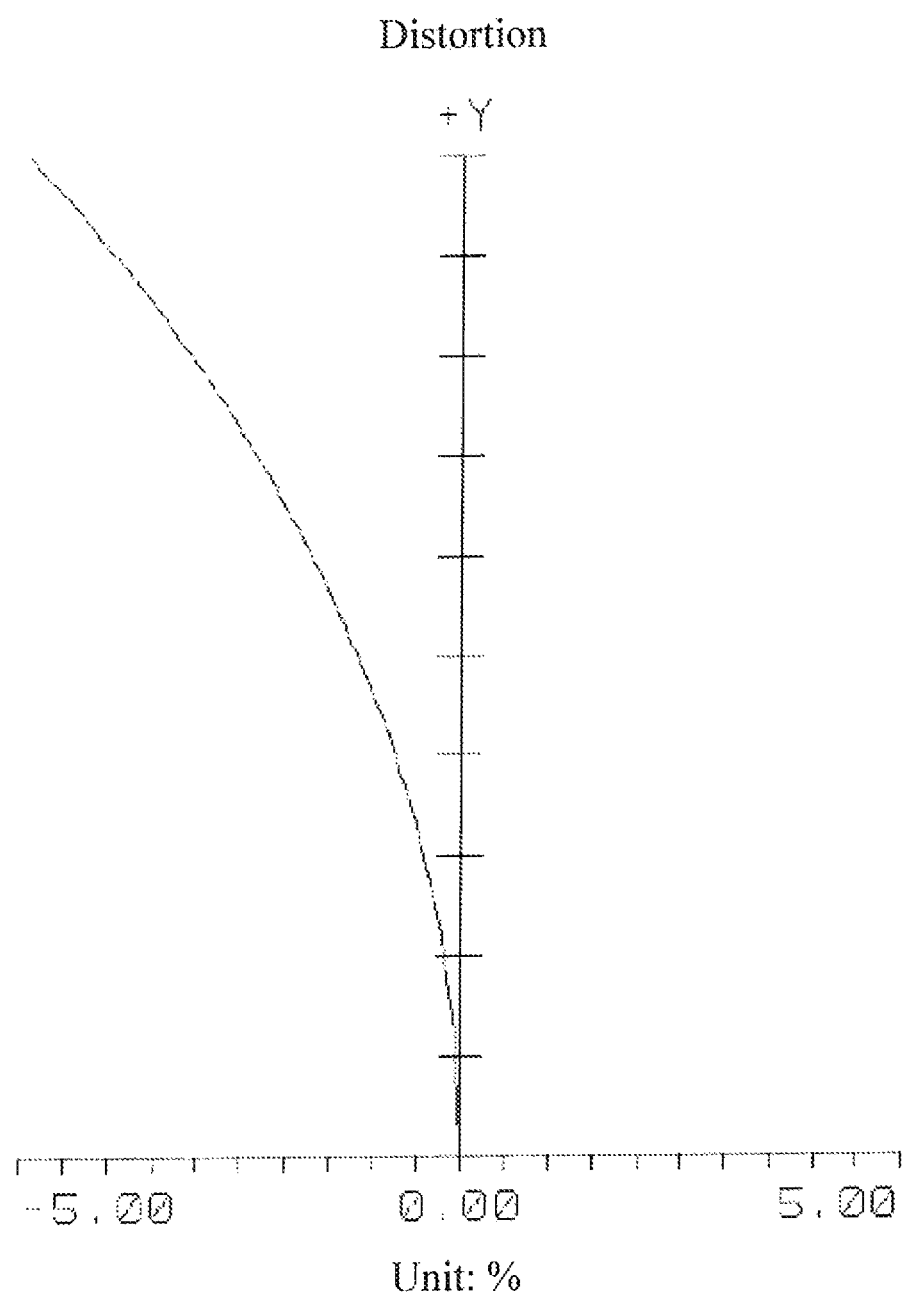
Figure 4:
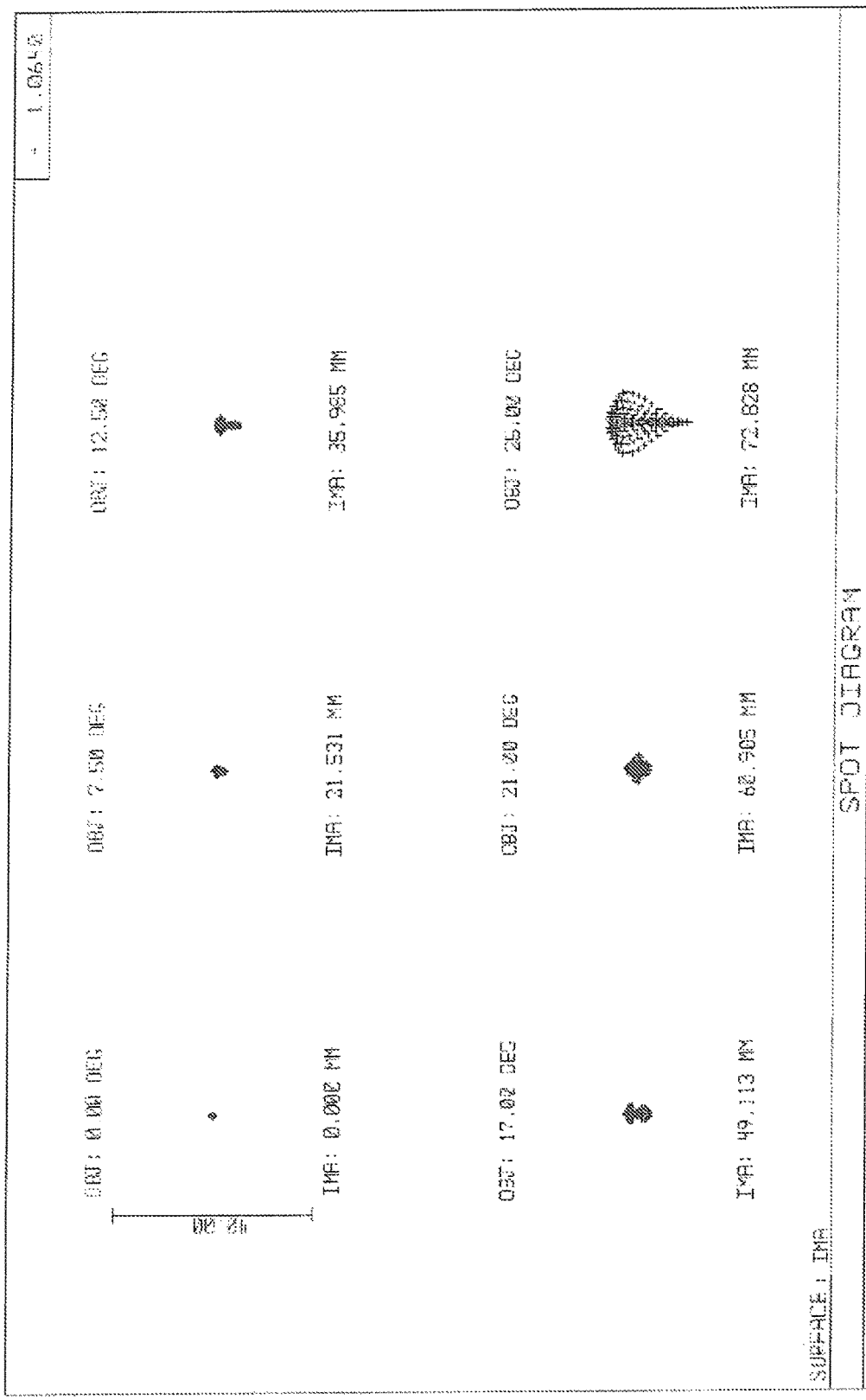
FIG. 4 is a diagram illustrating a geometric aberration of an F-θ lens for laser engraving according to an embodiment.
Figure 5:
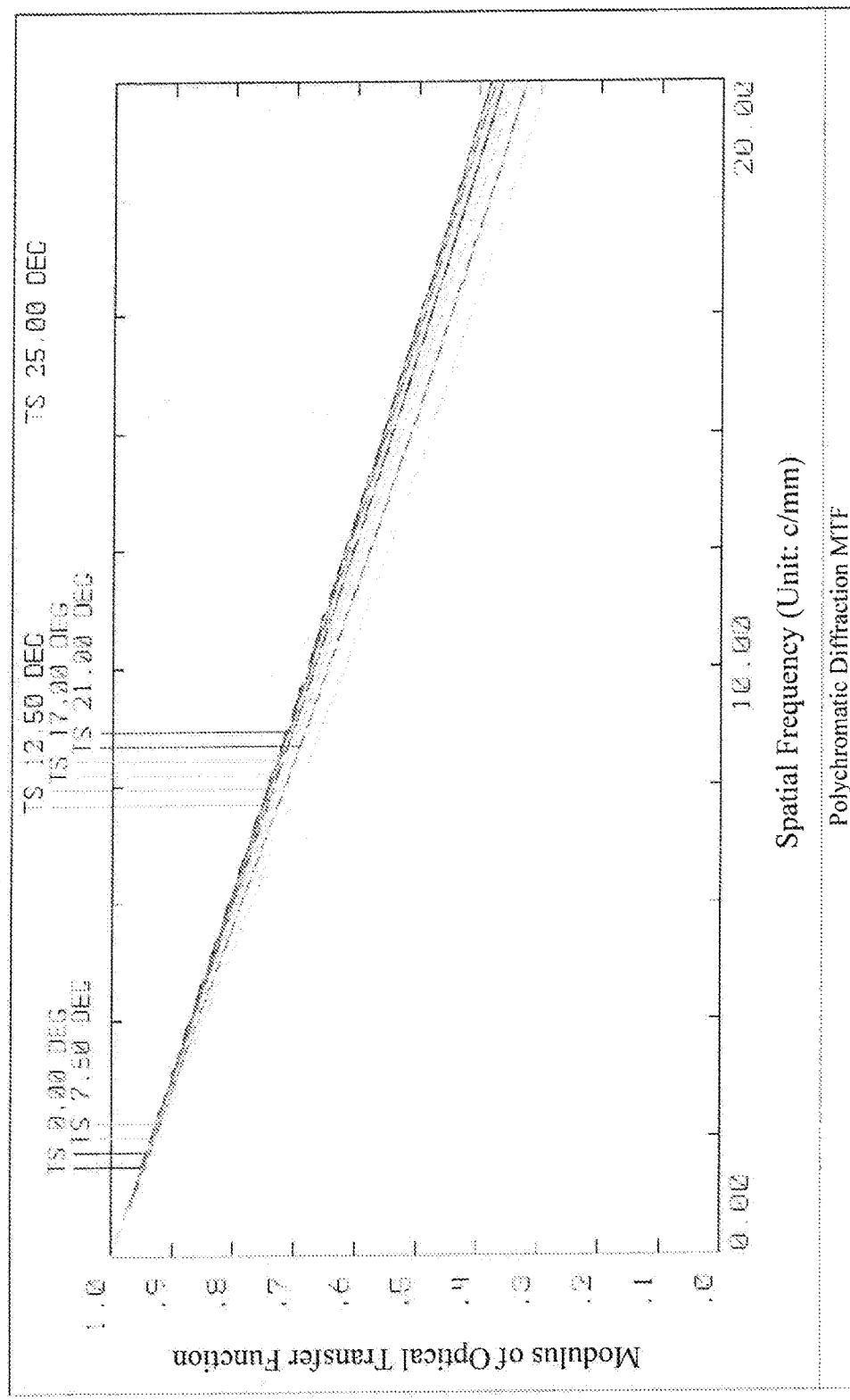
FIG. 5 is a diagram illustrating a modulation transfer function of an F-θ lens for laser engraving according to an embodiment.

FIG. 3 to FIG. 5 are diagrams illustrating fine beam aberration, geometric aberration, and modulation transfer function (transfer function M.T.F) of an F-θ lens for laser engraving in an embodiment, respectively.

FIG. 3A and FIG. 3B are graphs of field curvature and distortion of the F-θ lens for laser engraving, respectively. As shown in FIG. 3A and FIG. 3B, both field curvature and distortion of the F-θ lens for laser engraving reach the theoretical level.

As shown in FIG. 4, the sizes of dispersion circles of the whole image surface are within 6 μm, which reach the ideal value.

As shown in FIG. 5, when the resolution reaches 20 lines/mm, the value of the M.T.F of the F-θ lens for laser engraving is still greater than 0.3, thus achieving an ideal state.

As can be seen from the above data, the F-θ lens for laser engraving of the present disclosure can perform high-quality engraving operation, and is faster and more efficient than conventional lenses for laser engraving.

The foregoing implementations merely describe several embodiments of the present disclosure in detail, which should not be deemed as limitations to the scope of the present disclosure. It should be noted that without departing from the concept of the present disclosure, a number of modifications and variations can be made by those skilled in the art, and they shall all fall within the scope of the present disclosure. Therefore, the scope of the present disclosure shall be defined by the appended claims.

What is claimed is:

1. An F-θ lens for laser engraving, comprising a first lens, a second lens, a third lens, and a fourth lens, which are coaxially arranged along a transmission direction of incident light; wherein the first lens is a meniscus lens, the second lens is a meniscus lens, the third lens is a plano-convex lens, and the fourth lens is a flat lens;

wherein the first lens has a first surface and a second surface, the second lens has a third surface and a fourth surface, the third lens has a fifth surface and a sixth surface, and the fourth lens has a seventh surface and an eighth surface; the first surface to the eighth surface are sequentially arranged along the transmission direction of the incident light;

wherein radii of curvature of the first surface to the eighth surface are −29 mm, −88 mm, −56 mm, −36 mm, ∞, −116 mm, ∞, and ∞, respectively; and center thicknesses of the first lens to the fourth lens are 3 mm, 6 mm, 6 mm, and 3 mm, respectively.

2. The F-θ lens for laser engraving according to claim 1, wherein a ratio of refractive index to Abbe number of the first lens is 1.50/62, a ratio of refractive index to Abbe number of the second lens is 1.80/25, a ratio of refractive index to Abbe number of the third lens is 1.80/25, and a ratio of refractive index to Abbe number of the fourth lens is 1.50/62.

3. The F-θ lens for laser engraving according to claim 1, wherein an interval between the second surface and the third surface is 2 mm, an interval between the fourth surface and the fifth surface is 0.2 mm, and an interval between the sixth surface and the seventh surface is 2mm.

4. The F-θ lens for laser engraving according to claim 1, wherein both the radii of curvature and the center thicknesses have a tolerance range of 5%.

5. The F-θ lens for laser engraving according to claim 2, wherein each of the ratios of refractive index to Abbe number has a tolerance range of 5%.

6. The F-θ lens for laser engraving according to claim 3, wherein each of the intervals has a tolerance range of 5%.

* * * * *